H. Stephens
Cotton Harvester.
No. 44,828. Patented Oct. 25, 1864.
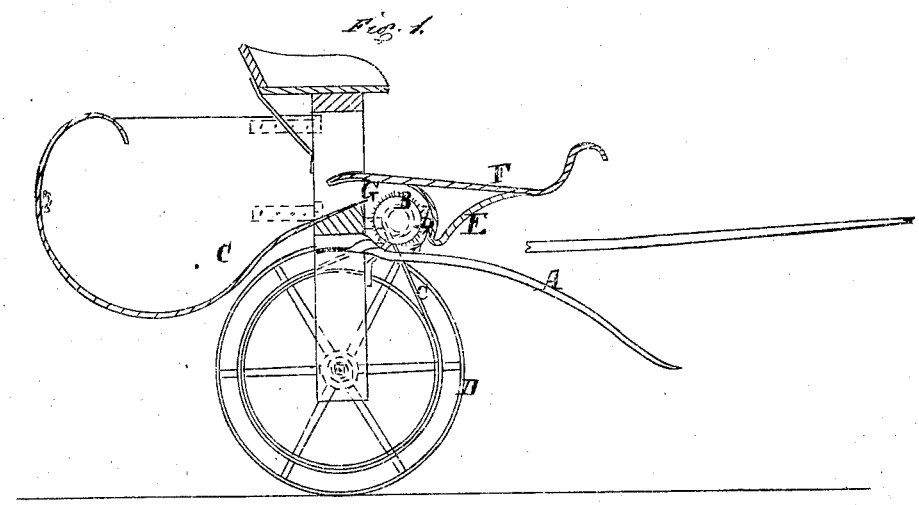
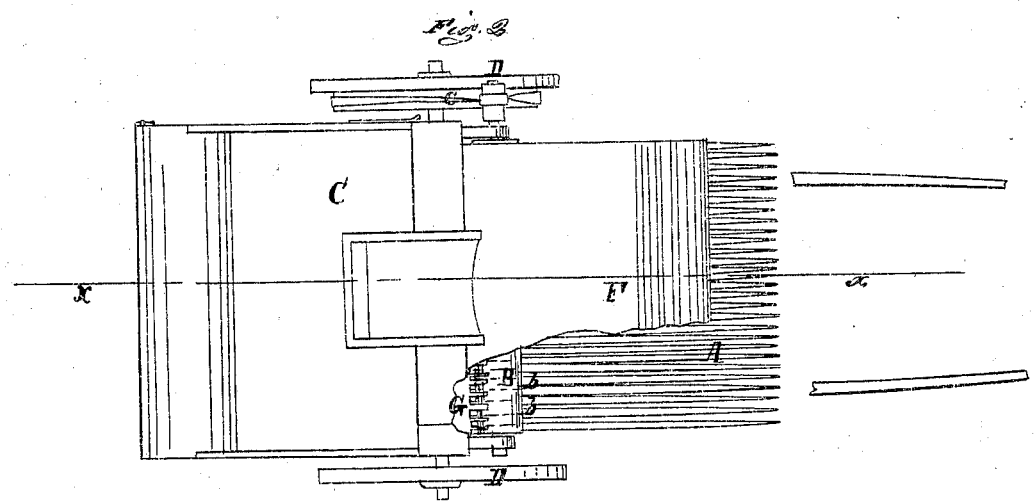
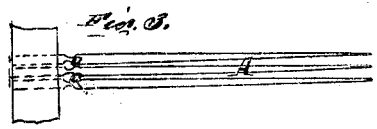
Witnesses.
Wm. P. McNamara
J. P. Hall
Inventor.
Hennell Stephens
per Munn & Co.
Attorneys

UNITED STATES PATENT OFFICE.

HENNELL STEVENS, OF MEMPHIS, TENNESSEE.

COTTON-PICKER.

Specification forming part of Letters Patent No. 44,828, dated October 25, 1864.

*To all whom it may concern:*

Be it known that I, HENNELL STEVENS, of Memphis, in the county of Shelby and State of Tennessee, have invented a new and Improved Cotton-Picker; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line, $x\,x$, Fig. 2; Fig. 2, a plan or top view of the same; Fig. 3, a detached face or top view of three of the fingers pertaining to the same.

Similar letters of reference indicate like parts.

Cotton is sown in drills about three feet apart, and grows from three to five feet in height, with a branching stem bearing bolls, at the extremities of the stems at different heights, and ripening at different times. A cotton-field is therefore picked two, three, or more times, as the length of the season or the amount of help permits. Two hundred and fifty pounds of seed-cotton or one hundred pounds of lint-cotton is considered a good day's work for a first-class hand. It requires many more hands to pick than to cultivate the cotton, and it often happens that a considerable proportion of the crop has to be plowed in, from inability to gather it before the time when it is necessary to prepare for the next year's crop. A machine, therefore, to pick cotton successfully must be so arranged as to select the ripe cotton-bolls, leaving those not yet matured uninjured, and must pick off the cotton without breaking the pod with it—results which, it is believed, are fully attained by my within-described invention.

My invention consists essentially of a set of fingers, A, to separate and hold the cotton-bolls, a picker, B, and receptacle C. The machine is drawn by one horse, and is mounted on two wheels, D D.

The fingers A may be constructed either of hard wood or metal. They are slightly curved longitudinally, pointed at their outer ends, and secured at their inner ends to the framing so as to have an inclined position, as shown in Fig. 1, the fingers being notched at their upper and inner parts at each side, as shown at $a$. (See more particularly Fig. 3.)

The picker B is placed directly over the upper and inner parts of the fingers, and is simply a cylinder provided with radial teeth $b$, arranged in rows circumferentially. The picker is driven by a belt, $c$, from a pulley attached concentrically to one of the wheels D.

E represents a shield composed of a curved plate attached to the under side of a foot-plate, F, or what answers as such, and is attached to the framing. This shield E projects down in front of the picker B, as shown in Fig. 1.

As the machine is drawn along the fingers A gather up the cotton-bolls, which pass up the inclined surfaces of the fingers, and finally come beneath the picker B, those on the shortest stems arriving first at the picker, while the taller ones are kept out of the way by the shield E until the machine has progressed far enough to draw them into the proper position. The picker B is placed at such a distance from the fingers that the unripe bolls pass underneath it without touching, while those that are ripe, being swelled open, with the cotton protruding, the latter is caught by the teeth of the picker and torn out of the pod, to which it is very loosely attached. The empty pods and unripe bolls, after passing the picker, are drawn through the slots or notches $a$ in the fingers, and so pass out of the machine. The teeth of the picker pass between the teeth of a comb, G, directly over the picker. This comb may be constructed in any proper manner, and it strips the cotton from the picker, the former, as it accumulates, being pressed down into the receptacle C.

To prevent several stems being caught and jammed between two fingers by being seized below the point where the branches separate, I propose to make the fingers A in two or more lengths, supported by braces from the footboard, leaving a sufficient space between the ends of the divisions to permit the stems to spring aside into lateral channels, but not large enough to allow the bolls to escape from the machine.

Having thus described my invention, I claim as new and desire to secure by Letters Patent—

1. The fingers A, arranged, as shown, to form an inclined surface, and provided with notches $a$ at their upper parts, substantially as and for the purpose specified.

2. The shield E, in connection with the fingers A and picker B, arranged to operate substantially as and for the purpose set forth.

3. The picker B, placed at such a distance from the fingers A that the unripe bolls may pass beneath it without being touched, while those in which the cotton protrudes are entangled and the cotton extracted from them.

4. The comb G, in connection with the picker B, shield E, fingers A, and receptacle C, all arranged to operate as set forth.

HENNELL STEVENS.

Witnesses:
   A. BLAKE,
   JAMES S. HAMBAUGH.